United States Patent [19]

Imazeki et al.

[11] 4,370,722
[45] Jan. 25, 1983

[54] TRACER CONTROL SYSTEM

[75] Inventors: Ryoji Imazeki; Etsuo Yamazaki; Takao Sasaki, all of Hachioji, Japan

[73] Assignee: Fujitsu Fanuc Limited, Tokyo, Japan

[21] Appl. No.: 222,662

[22] Filed: Jan. 5, 1981

[30] Foreign Application Priority Data

Jan. 17, 1980 [JP] Japan .................................. 55-3839

[51] Int. Cl.³ ...................... G05B 19/37; G06F 15/46
[52] U.S. Cl. ................... 364/474; 318/571; 318/578; 364/520
[58] Field of Search .............. 364/474, 475, 520, 168, 364/170, 171, 174; 318/571, 578, 39; 409/67, 79, 80, 98, 99, 126, 127, 130

[56] References Cited

U.S. PATENT DOCUMENTS

| | | | |
|---|---|---|---|
| 3,976,928 | 8/1976 | Wenzel | 318/578 |
| 4,044,289 | 8/1977 | Wenzel et al. | 318/578 X |
| 4,084,244 | 4/1978 | Floter | 364/520 X |
| 4,224,670 | 9/1980 | Yamazaki | 364/474 |
| 4,266,172 | 5/1981 | Yamazaki | 318/578 |

Primary Examiner—Joseph F. Ruggiero
Attorney, Agent, or Firm—Staas & Halsey

[57] ABSTRACT

Data for determining a limit value of the trace range of a model are stored in a memory and the stored data are read out therefrom by a processor to calculate the limit value of the trace range. The current position of a movable machine part is detected and compared with the limit value and when it is detected by the processor that the current position of the movable machine part has reached the limit value, a trace feed is switched to a pick feed. After the pick feed is performed a predetermined distance, it is switched again to the trace feed. A desired trace range is set to achieve tracer control without the provision of limit switches.

11 Claims, 13 Drawing Figures

TRACER CONTROL SYSTEM

BACKGROUND OF THE INVENTION

1. Field of the Invention

The present invention relates to a tracer cotrol system which permits setting of an optimum range of tracing in accordance with the configuration of a model to ensure efficient tracer control.

2. Description of the Prior Art

In conventional tracer control systems, the position of a limit switch is preadjusted in accordance with the configuration of a model and when the limit switch is activated by the movement of a tracer head, a pick feed is carried out and then the trace direction is reversed. Accordingly, the trace range becomes equal to a maximum length of the model in the trace direction, leading to the defect that unnecessary tracing increases in the case of a model having a partly projecting configuration. In addition, the limit switch operates mechanically, and hence it has the defect of low reliability.

SUMMARY OF THE INVENTION

It is an object of the present invention to provide a tracer control system which is free from the abovesaid drawbacks of the prior art and which minimizes the trace range in conformity with the configuration of a model to eliminate unnecessary tracing.

Another object of the present invention is to provide a tracer control system which is capable of setting a desired trace range without involving the use of a limit switch of mechanical operation.

Briefly stated, the tracer control system of the present invention is provided with a memory for storing data such as coordinates for determining a limit value of the trace range of a model and so forth, a processor for reading out the data stored in the memory to calculate the limit value of the trace range and control the tracing, and means for detecting the current position of a movable machine part. A comparison is made between the limit value of the trace range calculated by the processor and the current position of the movable machine part, and when it is detected that the current position has reached the limit value, a trace feed is switched to a pick feed and, after the pick feed is performed by a predetermined amount, the trace feed is resumed.

DETAILED DESCRIPTION OF THE PREFERRED EMBODIMENTS

Figure 1:
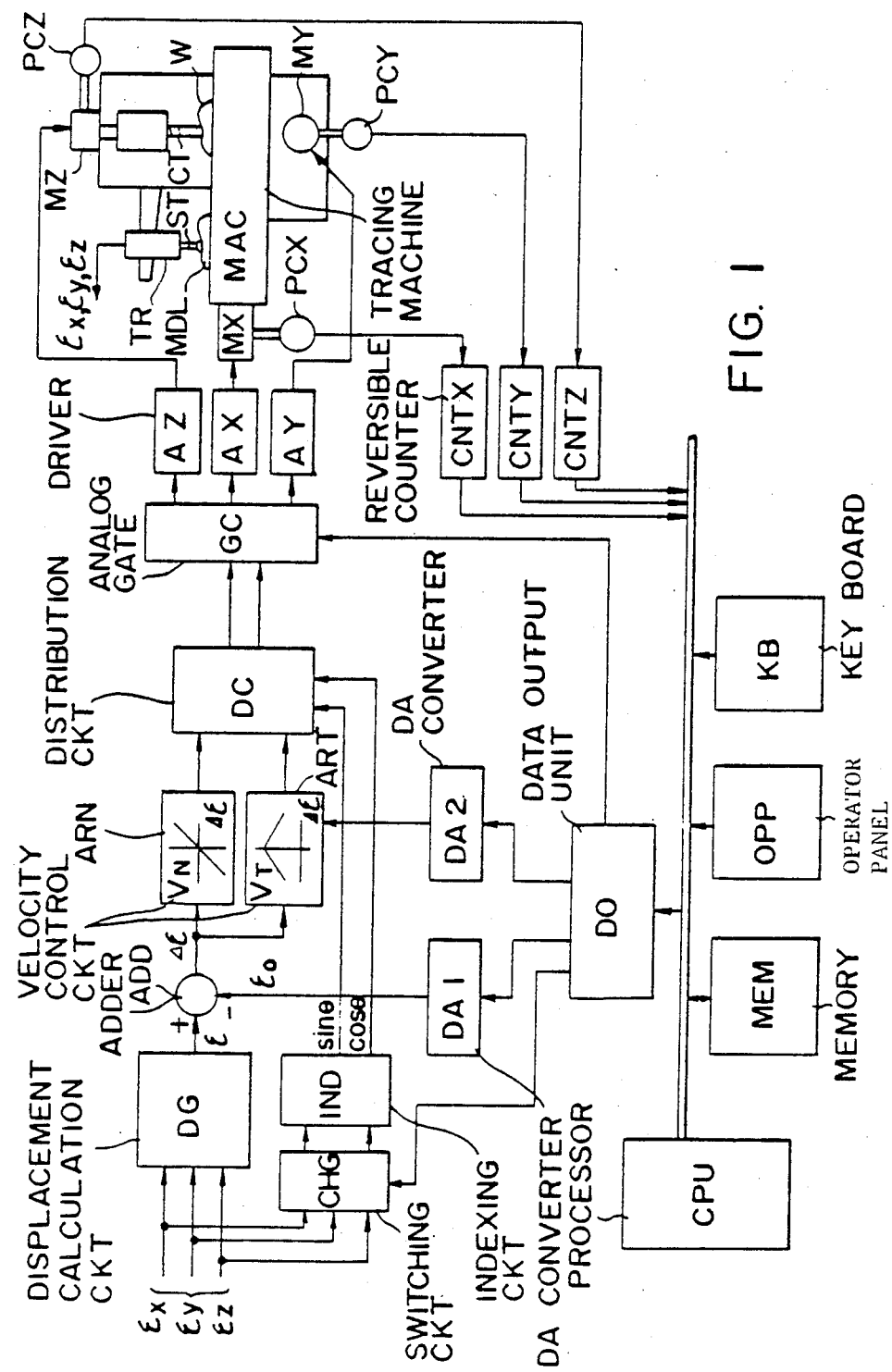
FIG. 1 is a block diagram illustrating an embodiment of the present invention.

FIG. 1 illustrates in block form an embodiment of the present invention. In FIG. 1, reference character MAC indicates a tracing machine; MDL designates a model; W identifies a work; ST denotes a stylus which makes contact with the surface of the model MDL; TR represents a tracer head which yields displacement signals $\epsilon_x$, $\epsilon_y$ and $\epsilon_z$ corresponding to the displacement of the stylus ST; CT shows a cutter for cutting the work W; MX, MY and MZ refer to servomotors of the X-axis, Y-axis and Z-axis, respectively; PCX, PCY and PCZ indicate resolvers, pulse coders or like position detectors which are respectively coupled with the servomotors MX, MY and MZ to detect the position of a movable machine part; DG designates a displacement calculation circuit for combining the displacement signals $\epsilon_x$, $\epsilon_y$ and $\epsilon_z$ into a composite displacement signal, $\epsilon = \sqrt{\epsilon_x^2 + \epsilon_y^2 + \epsilon_z^2}$; CHG identifies a change-over circuit for selectively switching the displacement signals; IND denotes an indexing circuit for deriving displacement-direction signals $\sin \theta$ and $\cos \theta$ from the displacement signals; ADD represents an adder for obtaining a difference signal, $\Delta\epsilon = \epsilon - \epsilon_0$, between the composite displacement signal $\epsilon$ and a reference displacement signal $\epsilon_0$; ARN and ART show velocity control circuits for deriving a normal-direction velocity signal $V_N$ and a tangential-direction velocity signal $V_T$, respectively, from the difference signal $\Delta\epsilon$; DC refers to a distribution circuit for providing a velocity command signal in accordance with the normal-direction velocity signal $V_N$, the tangential-direction velocity signal $V_T$ and the displacement-direction signals $\sin \theta$ and $\cos \theta$; GC indicates an analog gate circuit for making operable the motors MX, MY or MZ as designated by the velocity command signal; AX, AY and AZ designate drivers for power supply to the servomotors MX, MY and MZ, respectively; CNTX, CNTY and CNTZ identify reversible counters for obtaining the current position of the movable machine part by reversible counting of pulses from the position detectors PCX, PCY and PCZ; CPU denotes a processor for performing control of respective parts, calculations and so forth; DO represents a data output unit for outputting control data from the processor to respective parts; MEM shows a memory for storing a control program and various data; OPP refers to an operator panel for entering information such as machining start, machining velocity, etc.; KB indicates a keyboard for entering various data; and, DA1 and DA2 designate D-A converters.

The tracer head TR and the cutter CT are fed as one body and, using the displacement signals $\epsilon_x$, $\epsilon_y$ and $\epsilon_z$ corresponding to the displacement of the stylus ST held in contact with the model MDL, the feed velocity component in each axis is calculated for trace-machining the work W. Such a trace-machining operation is already known in the art, and no detailed description will be given thereof.

The present invention is intended to perform tracer control in accordance with a limit value of the trace range corresponding to the configuration of the model MDL which is prespecified or calculated from initial values. For example, limit value data of the trace range are entered from the keyboard KB and loaded in the memory MEM under the control of the processor CPU. Since the reversible counters CNTX, CNTY and CNTZ indicate the current position of the movable machine part, the current position is compared with the limit value of the trace range and, by the coincidence of these, there is carried out a control similar to that obtainable with the operation of a limit switch.

The memory MEM has stored therein data pre-entered from the keyboard KB, etc., such as a both ways or a one way scan trace mode, a trace direction, a trace velocity, a pick feed direction, a pick feed velocity, a pick feed value, a reference displacement value and so forth. For instance, the reference displacement value data is read out from the memory MEM and applied via the data output unit DO to the D-A converter DA1, wherein it is converted to the reference displacement signal $\epsilon_0$ in analog form, which is provided to the adder ADD.

Figure 2:
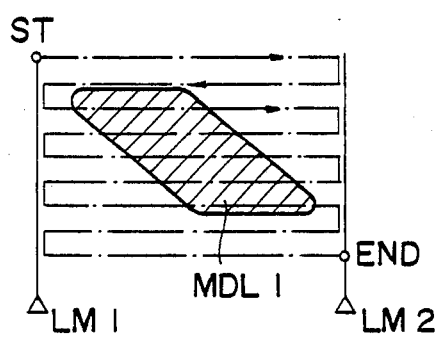
FIGS. 2 and 3 are schematic diagrams explanatory of the setting of a trace range by a limit switch.
Figure 3:
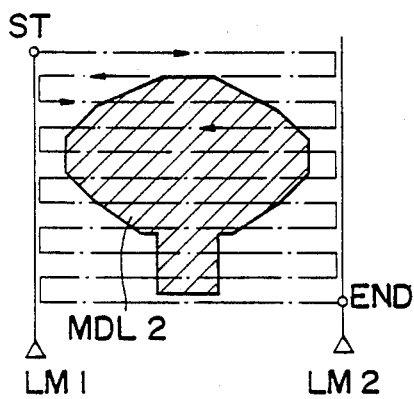

In the cases of models MDL1 and MDL2 shown in FIGS. 2 and 3, when limit switches LM1 and LM2 or limits of trace ranges are set as illustrated, tracer control is performed from a start point ST to an end point END along the chain lines. As is evident from FIGS. 2 and 3, the tracing includes unnecessary areas in this case.

Figure 4:
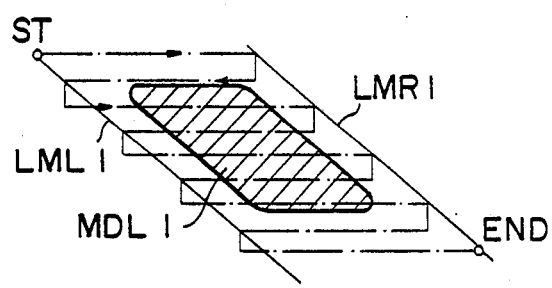
FIGS. 4 to 7 are schematic diagrams explanatory of the setting of the trace range in accordance with the embodiments of the present invention.
Figure 5:
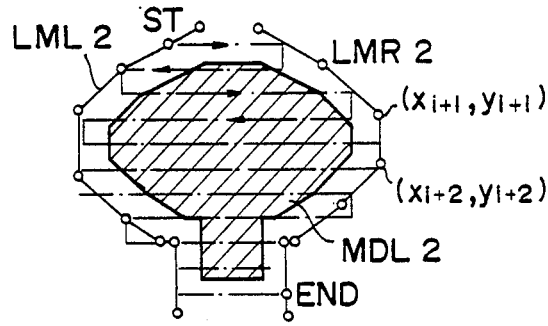
Figure 6:
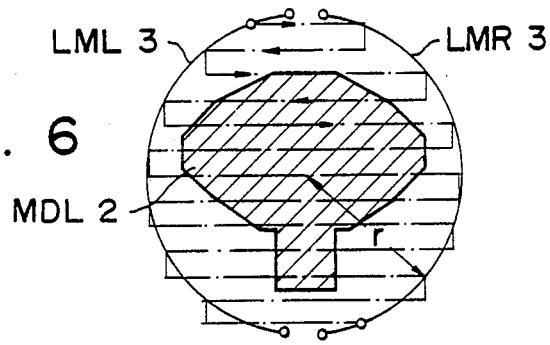

To avoid such unnecessary tracing, according to the present invention, limit values LML1, LMR1, LML2, LMR2, LML3, LMR3 of respective trace areas are set for tracing the models MDL1 and MDL2 as shown in FIGS. 4, 5 and 6. For example, in FIG. 4, the limit values LML1 and LMR1 are obtained through calculation by specifying the coordinates of the start point ST and the end point END and the inclination angles of the limit values LML1 and LMR1 or the distance of one trace feed, and the limit values thus obtained are compared with the current position of the trace feed. In FIG. 5, the coordinates of the limit values LML2 and LMR2 are specified. In FIG. 6, since the model MDL2 lies in a circle of a radius r, the limit values LML3 and LMR3 of the radius r are set.

Figure 7:
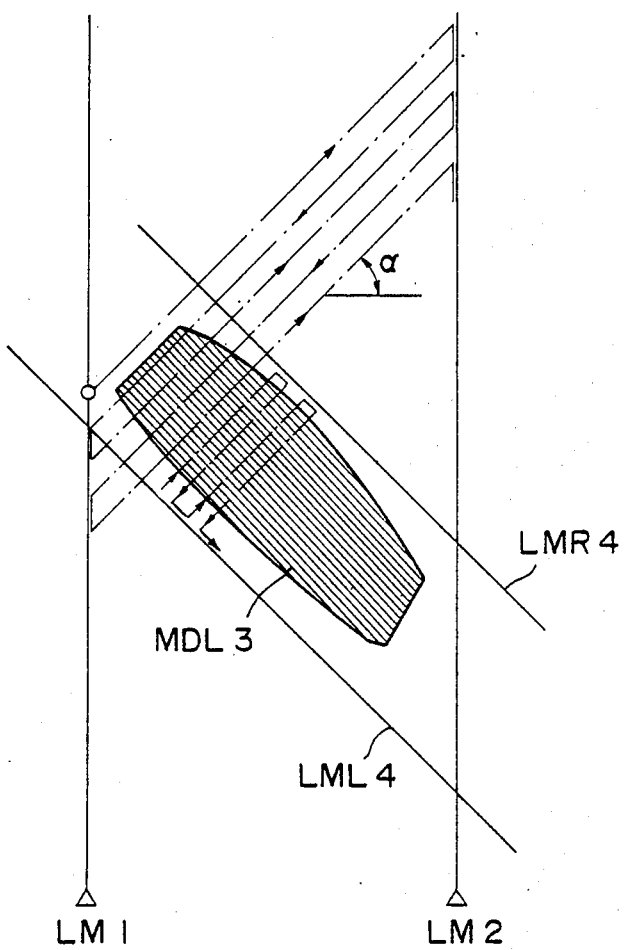

Further, in the case where the trace direction is inclined at an angle $\alpha$ to the X-axis as shown in FIG. 7, it is common practice in the prior art to set the limit switches LM1 and LM2 as shown, but in the present invention limit values LML4 and LMR4 are set as illustrated, reducing the trace range.

Figure 8:
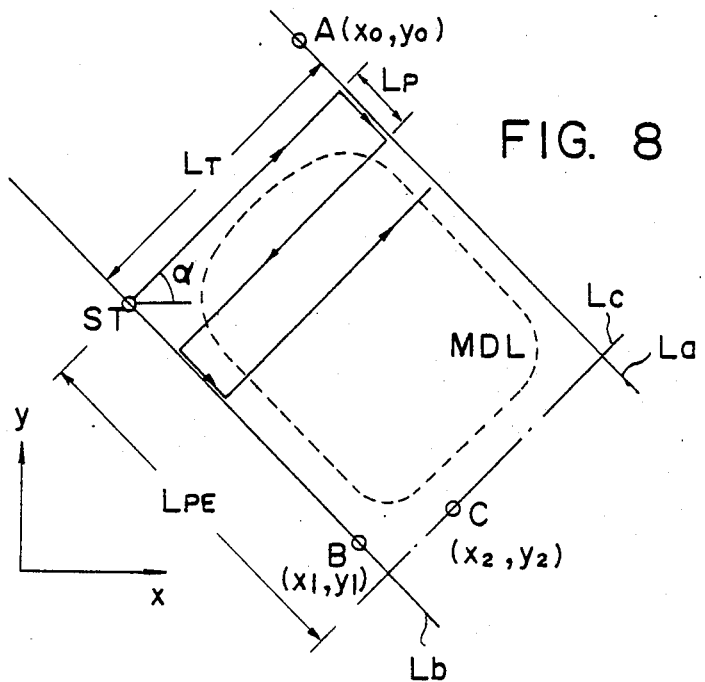
FIG. 8 is a schematic diagram explanatory of data for determining the trace range in a embodiment of the present invention.
Figure 9:
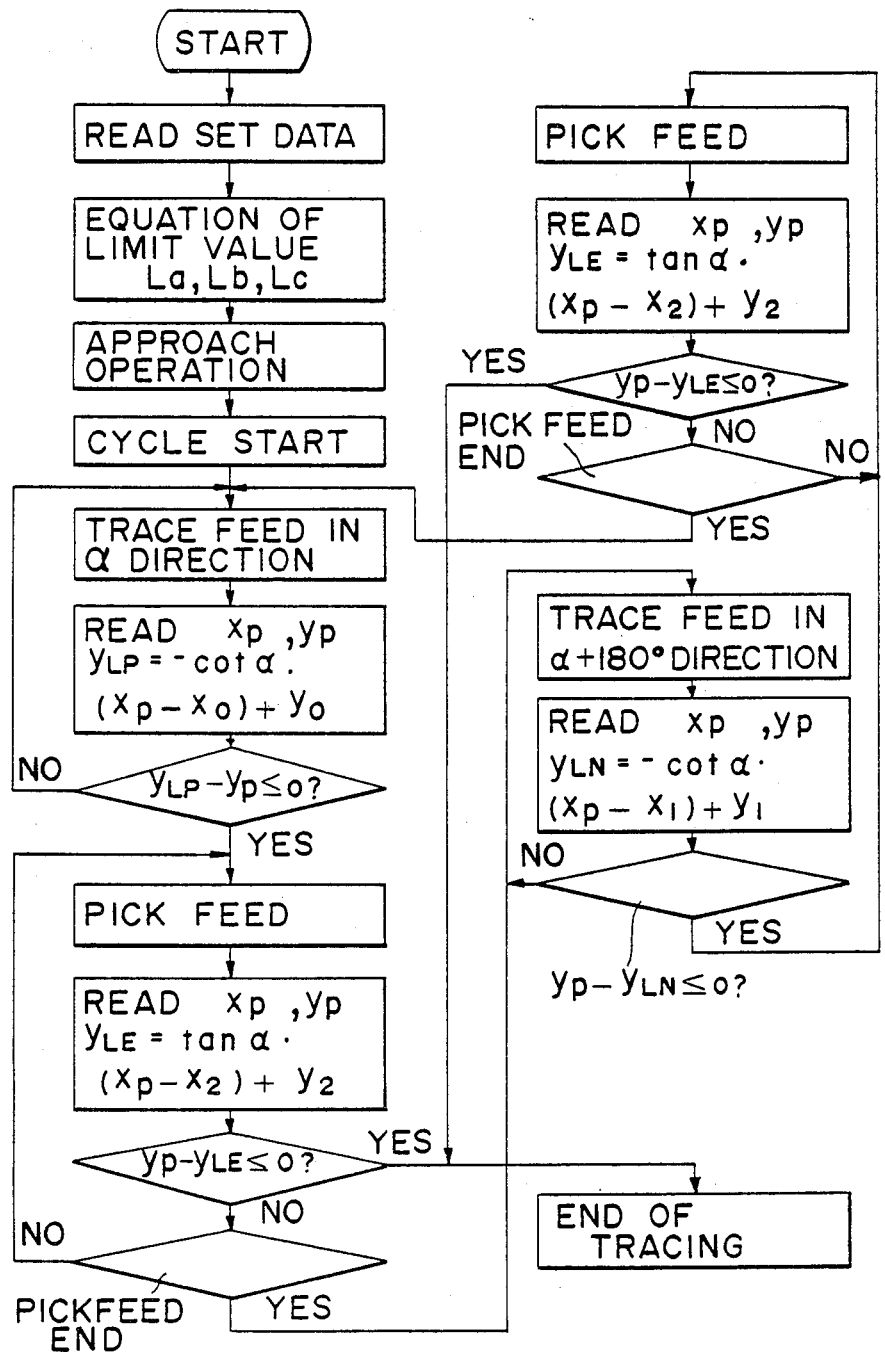
FIGS. 9 and 10 are flowcharts of the operations of first and second embodiments of the present invention.

FIG. 9 shows a flowchart of tracer control with the trace range of the model MDL set by the set data from the keyboard KB and so on which are the coordinates of points A, B and C and the angle $\alpha$ of the trace directions shown in FIG. 8. At first, the set data are loaded in the memory MEM under the control of the processor CPU and then the data are read in the processor CPU, wherein the equations of the limit values La, Lb and Lc are obtained respectively as follows:

$$y_{LP} = -\cot \alpha(x - x_0) + y_0 \quad (1)$$

$$y_{LN} = -\cot \alpha(x - x_1) + y_1 \quad (2)$$

$$y_{LE} = \tan \alpha(x - x_2) + y_2 \quad (3)$$

Upon depressing a start button on the operator panel OPP, an approach is made to the trace start point and when the stylus ST makes contact with the model MDL, the displacement signals $\epsilon_x$, $\epsilon_y$ and $\epsilon_z$ are yielded to indicate the completion of the approach and then tracing is started. Since the trace direction is the direction $\alpha$, the servomotors MX and MY are driven to perform tracing in the set direction $\alpha$.

Since the current positions $x_p$ and $y_p$ are indicated by the count values of the reversible counters CNTX and CNTY as mentioned previously, the processor CPU reads out the count values of the reversible counters CNTX and CNTY at regular time intervals and conducts the calculation $$y_{LP} = -\cot \alpha(x_p - x_0) + y_0 \quad (4)$$

and makes a comparison between the calculation result and the current position; namely a decision $y_{LP} - y_p \leq 0$ is made. When this condition is met, the trace feed is switched to the pick feed. As the pick feed direction, velocity and value are already entered to be stored in the memory MEM as described previously, the pick feed takes place following the input data. And the current positions $x_p$ and $y_p$ are read out and for deciding whether a limit value Lc is reached or not, the following calculation is conducted:

$$y_{LE} = \tan \alpha(x_p - x_2) + y_2 \quad (5)$$

and a decision $y_p - y_{LE} \leq 0$ is made. If the pick feed ends before this condition is fulfilled, then the trace direction is varied through 180° and the trace feed is carried out in that direction and, further, the current positions $x_p$ and $y_p$ are read out at regular time intervals and the calculation $$y_{LN} = -\cot \alpha(x_p - x_1) + y_1 \quad (6)$$

is effected and then a decision $y_p - y_{LN} \leq 0$ is made. When this condition is fulfilled, the trace feed is switched to the pick feed and, upon completion of the pick feed, the trace feed direction is changed through 180°.

Accordingly, the tracer control can be achieved with high efficiency setting the limit values LML4 and LMR4 so that the trace range of the model MDL3 is narrow, as described previously in respect of FIG. 7.

Figure 10:
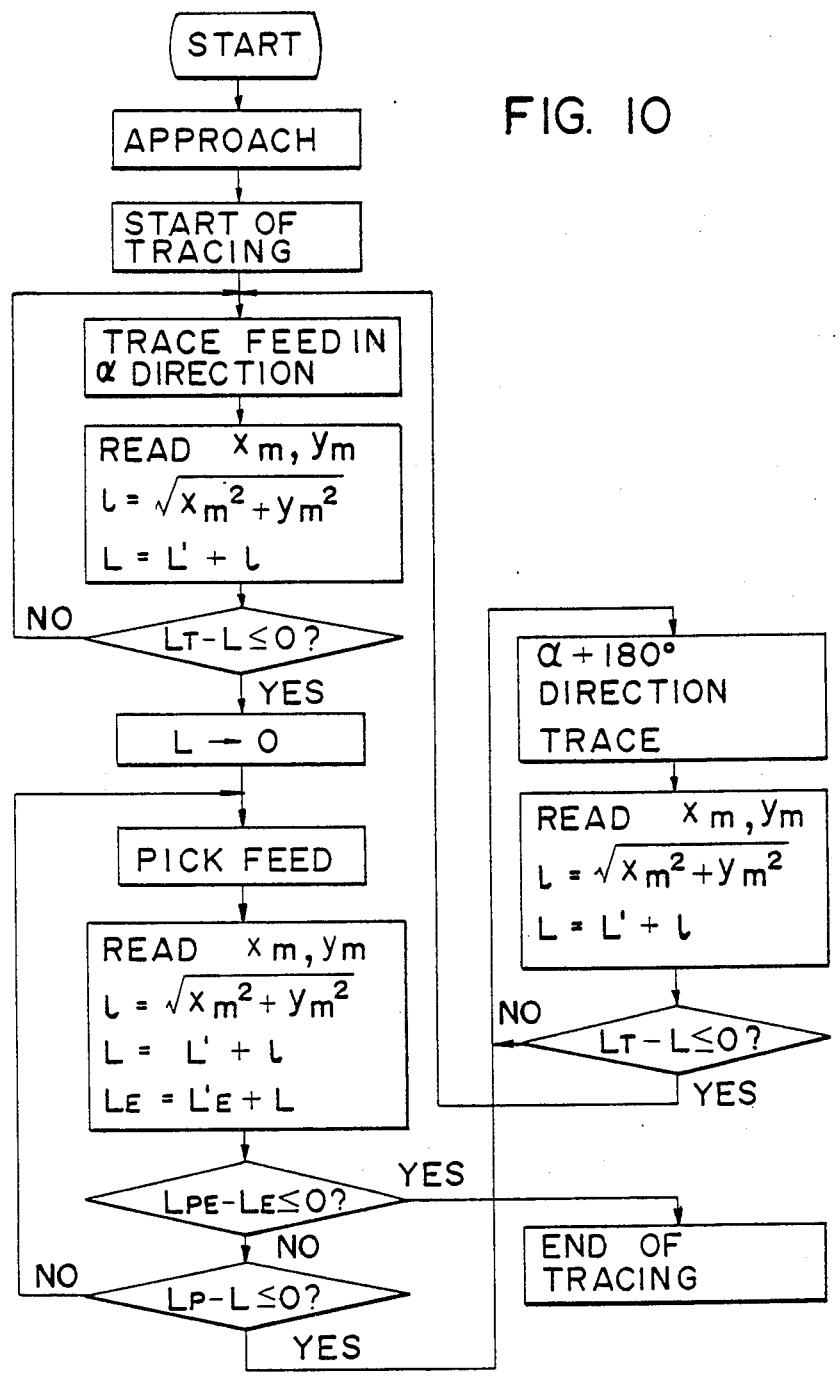

Further, in the case where the trace feed direction $\alpha$ and distances $L_T$, $L_{PE}$ and $L_P$ are provided, as shown in FIG. 8, the tracer control follows the flowchart shown in FIG. 10. That is, after the set data are set in the memory MEM, the tracing start point ST is approached and, upon completion of the approach, tracing starts and the trace feed is performed in the direction $\alpha$. The distance of movement from the start point ST can be obtained by reading out the count contents of the reversible counters CNTX and CNTY. From differences between the count contents and the immediately preceding ones, the distances of movement along the X-axis and the Y-axis, $x_m$ and $y_m$, in the time interval between the moments of detection are obtained, from which the distance of movement l in the trace feed direction can be obtained by the following calculation:

$$l = \sqrt{x_m^2 + y_m^2} \quad (7)$$

Accordingly, by adding the distance of movement l to the distance L' moved until the previous detection, that is, by the following addition:

$$L = L' + l \quad (8)$$

the distance of movement L from the start point ST can be obtained.

The distance of movement L thus obtained and the set distance $L_T$ in the trace feed direction are compared with each other to make a decision $L_T - L \leq 0$. When this condition is fulfilled, it means that the limit value La is reached, so that the distance of movement L is made zero. That is, the distance of movement L is stored in the memory MEM, updating the result of the addition of the equation (8) by the control and calculation of the processor CPU, so that when $L_T=L$, the distance L stored in the memory MEM is made zero.

Next, the trace feed shifts to the pick feed. The pick feed direction can be set as desired; in this embodiment, the pick feed direction is set to be perpendicular to the trace feed direction. The distances of movement $x_m$ and $y_m$ in the X- and the Y-axis are obtained at regular time intervals; the distance of movement l in each time interval is obtained by the equation (7); the distance L of movement from the moment of start of the pick feed is obtained by the equation (8); and the distance $L_E$ from the start point ST in the pick feed direction is obtained by $$L_E = L_E' + L \qquad (9)$$

based on the distance $L_E'$ at the moment of the immediately preceding calculation.

Then the decision $L_{PE} - L_E \leq 0$ is made. When this condition is fulfilled, the tracing comes to an end. If the condition is not satisfied, then a decision $L_P - L \leq 0$ is made and when this condition is fulfilled, it means that a predetermined pick feed value has been reached, so that a trace feed is started in a direction opposite to the previous trace feed direction, that is, in a direction $\alpha + 180°$. In the decision of $L_{PE} - L_E \leq 0$, since a value n times the pick feed value $L_P$ is equal to $L_{PE}$, it is also possible to put an end to the tracing by counting the number of times of the pick feed and deciding whether it is n or not.

Figure 11:
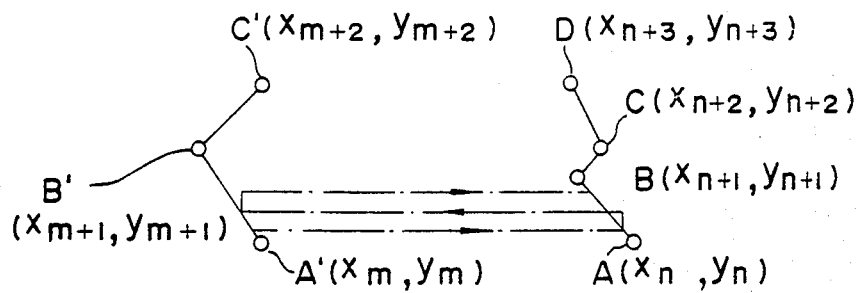
FIG. 11 is a schematic diagram explanatory of data for determining the limit value of the trace range in a third embodiment of the present invention.
Figure 12:
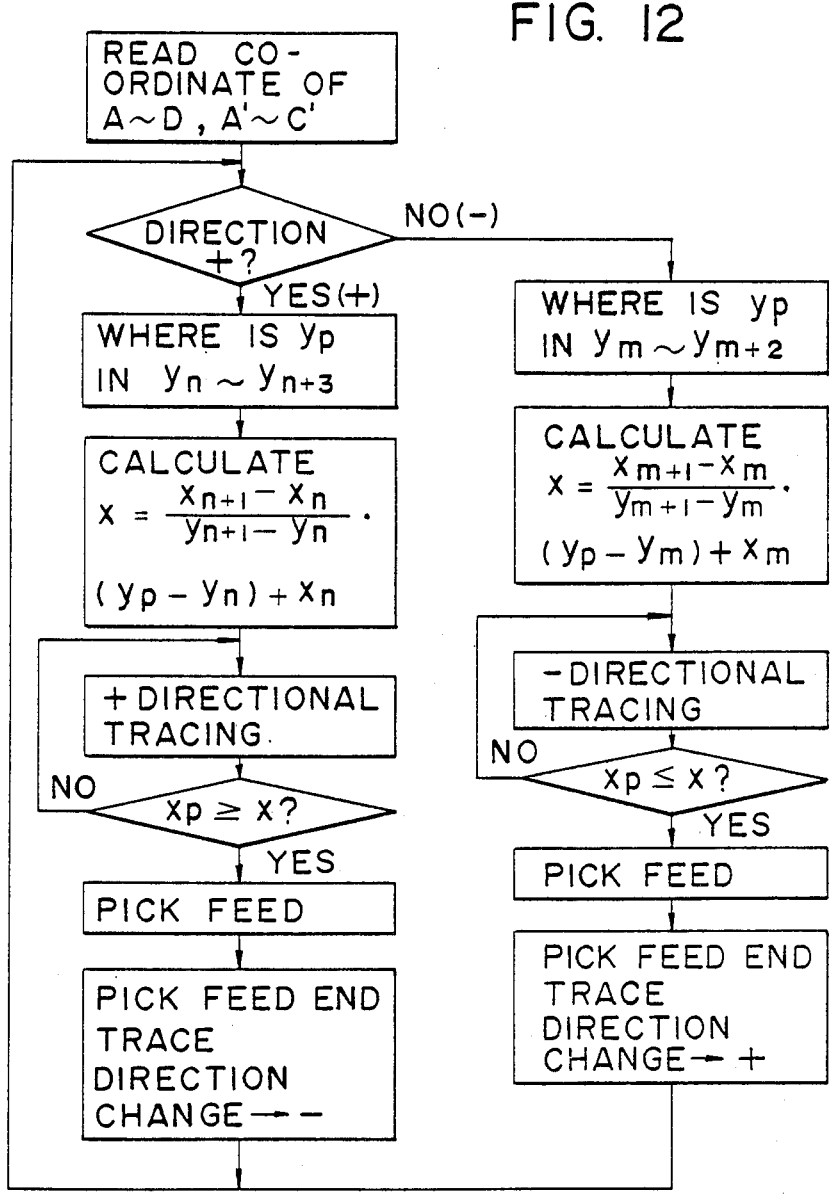
FIGS. 12 and 13 are flowcharts of the operations of the third and fourth embodiments of the present invention.

As described previously in connection with FIG. 5, in the case where the coordinate values of the limit values LML2 and LMR2 are set, for example, when the coordinates of points A to D and A' to C' in FIG. 11 are set, the tracer control is performed following the flowchart of FIG. 12. Namely, the coordinates of the points A to D and A' to C' are loaded in the memory MEM and the approach operation is carried out in the same manner as in the foregoing embodiment, and then the tracing is started. In this embodiment, the trace feed in the X-axis direction and the pick feed in the Y-axis direction are conducted and the trace feed from right to left is indicated by +. Accordingly, it is checked whether the trace direction is + or − and, in the case of +, the current position $y_p$ is compared with the Y coordinates of the points A to D.

In the case where the current position $y_p$ indicated by the count content of the reversible counter CNTY is read out by the processor CPU to detect that the current position $y_p$ lies between the y coordinates of the points A and B as described above, the following calculation is conducted:

$$x = \frac{x_{n+1} - x_n}{y_{n+1} - y_n}(y_p - y_n) + x_n \qquad (10)$$

to obtain an inclined limit value between the points A and B.

Next, the tracing in the direction + is started and, at regular time intervals, the count content of the reversible counter CNTX, that is, the current position $x_p$ is read out by the processor CPU and a decision $x_p \geq x$ is made. If this condition is established, the tracing is switched to the pick feed. Since the direction, velocity and value of the pick feed are preset, the motor MY is driven in accordance with them to achieve the pick feed in the Y-axis direction. As the variation in the count content of the reversible counter CNTY after the start of the pick feed corresponds to the pick feed value, the processor CPU checks whether the preset pick feed value has been reached or not, thereby detecting the end of the pick feed.

Upon completion of the pick feed, the trace direction is reversed. When the trace direction is reversed, it is checked whether the current position $y_p$ on the Y coordinate lies within Y coordinates $y_m$ to $y_{m+2}$ of the points A' to C'. In the case where it lies between the points A' and B', the following calculation is conducted:

$$x = \frac{x_{m+1} - x_m}{y_{m+1} - y_m}(y_p - y_m) + x_m \qquad (11)$$

and a one way scan trace is started and then a decision $x_p \leq x$ is made. When the one way scan trace proceeds to fulfil the above condition, the pick feed takes place.

The abovesaid operations are repeated to execute a both ways scan trace and when the trace reaches the coordinates of the trace terminating end, the trace comes to an end. Accordingly, by setting the coordinates of the limit values LML2 and LMR2 shown in FIG. 5, the trace range of the model MDL2 can be minimized.

Figure 13:
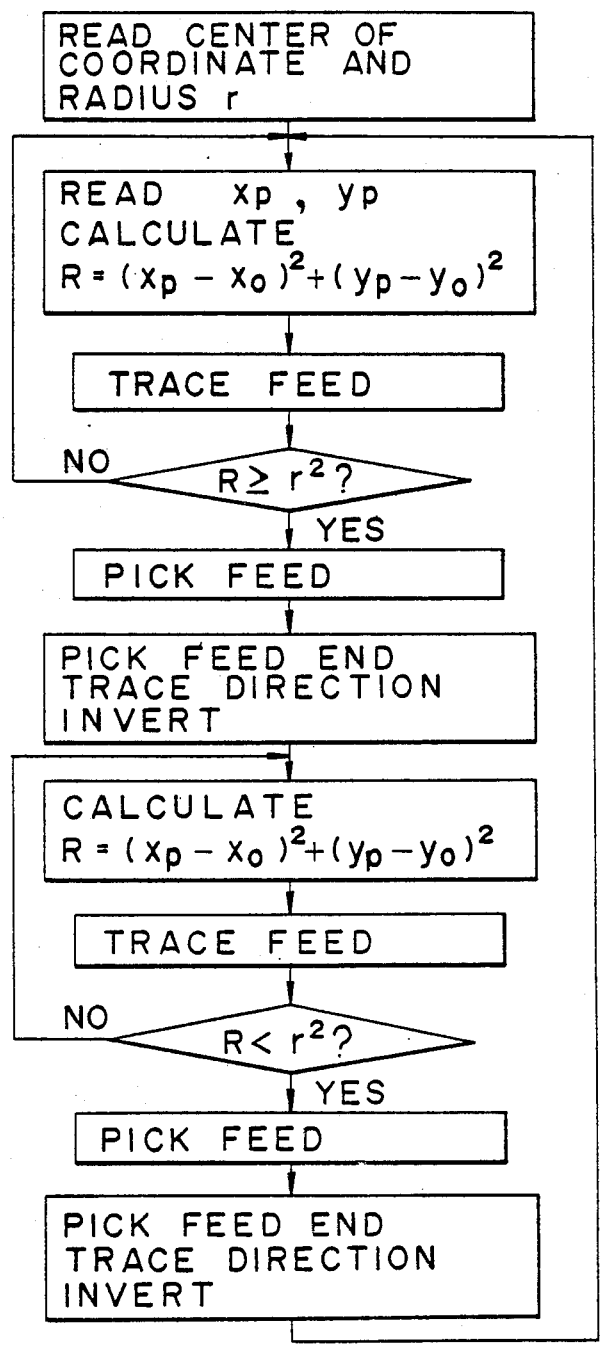

In the case of FIG. 6, center coordinates $x_0$ and $y_0$ and the radius r are inputted and control is conducted following the flowchart shown in FIG. 13. That is, the current values $x_p$ and $y_p$ of the reversible counters CNTX and CNTY are read in and $$R = (x_p - x_0)^2 + (y_p - y_0)^2 \qquad (12)$$

is calculated and a trace feed starts to the right.

A decision $R \geq r^2$ is then made at regular time intervals. When this condition is fulfilled, it means that the trace feed has reached the limit value on the right-hand side, so that the trace feed is changed over to a pick feed. Upon completion of the pick feed, the trace feed direction is reversed and after the calculation of the equation (12), the trace feed is started to the left. Then a decision $R < r^2$ is made, and if this condition is satisfied, it means that the trace feed has reached the limit value on the left-hand side, and consequently the trace feed is switched to the pick feed. It is then checked whether the position of the stylus moved by the pick feed is the trace terminating end or not and if so, the trace comes to an end.

As has been described in the foregoing, in the present invention, data such as coordinates, distances, a radius, etc. for determining a limit value of the trace range of a model MDL are entered from the keyboard KB to be stored in the memory MEM; the stored data of the memory MEM are read out by the processor CPU to calculate the limit value; the current position of a movable machine part detected by detecting means such as a reversible counter or the like is compared with the calculated limit value; when it is detected that the current position has reached the limit value, a pick feed takes place; and after the pick feed is performed a predetermined distance, a trace feed is started. Accordingly, no mechanical limit switches are required and, in addition, not only linear limit values but also nonlinear ones can be determined, so that the trace range can be set at a minimum in accordance with the configuration of the model. Therefore, no unnecessary tracer control is involved and the time for tracing can be reduced.

It will be apparent that many modifications and variations may be effected without departing from the scope of the novel concepts of this invention.

What is claimed is:

1. A tracer control system in which the configuration of a model is detected by the motion of a tracer head with a stylus relative to the model surface being traced during a selected tracing, said system including a movable machine part moving along machine axes for providing said motion, and in which feed velocity components along said machine axes for providing the motion are obtained by arithmetic processing of data including displacement signals corresponding to the position of the end of said stylus with respect to the tracer head, said displacement signals having components corresponding to said machine axes, said motion of said tracer head selectively comprising sequential trace feed and pick feed steps, the tracer control system comprising:

a memory for storing data for determining the limits of the range of a selected tracing of the surface of the model;

a processor for reading out the stored data of the memory, for performing any necessary calculation of the limits of the range of the selected tracing from said stored data, and for performing control functions for performing said selected tracing over said range defined by said limits; and detecting means for detecting the current position of said movable machine part along each said machine axis;

wherein each said limit of the selected tracing corresponding to a respective machine axis is compared with the current position along the respective machine axis, and when it is detected that the current position has reached a respective limit, during one of said trace feed steps, the trace feed step is switched to a pick feed step, and, after the pick feed step is performed for a respective predetermined distance, a predetermined subsequent trace feed step is performed, until said selected tracing is completed over said range.

2. A tracer control system according to claim 1 wherein the means for detecting the current position of the movable machine part along each said machine axis comprises a respective reversible counter for counting pulses from a respective position detector corresponding to each said machine axis.

3. A tracer control system according to claim 1 wherein said data stored in said memory for determining the limits of the range of said selected tracing of the model include coordinate values along said machine axes of the starting and terminating points of said selected tracing.

4. A tracer control system according to claim 1 wherein said range is circular and said data stored in said memory for determining the limits of the selected tracing are coordinate values along said machine axes of the center of the circular range and a radius therefrom.

5. The system of claim 1, 2 or 3, at least selected ones of said data for determining said limits of said tracing range representing straight line segments crossing through predetermined respective coordinate points along selected ones of said machine axes.

6. The system of claim 5, at least one of said straight line segments being parallel to at least one of the directions of said trace and pick feed steps.

7. The system of claim 1, 2 or 3, said stored data including at least the coordinates of the starting point of said selected tracing along respective ones of said machine axes and the inclination angle of each said trace feed with respect to selected ones of said machine axes.

8. The system of claim 1, 2 or 3, said selected tracing involving successive trace feed steps in opposite directions, said stored data including a length for each said trace feed step in a selected direction and a different length for each trace feed step in the opposite direction.

9. The system of claim 5, the range of said selected tracing being defined at least in part by the intersection of two of said straight line segments.

10. The system of claim 5, at least one of said straight line segments being defined by a respective coordinate point along one of said machine axes and a respective inclination angles for the slope of said line segment with respect thereto.

11. The system of claim 1, 2 or 3, comprising a keyboard for selectively inputting said data defining the range of each said selected tracing for said storage in said memory.

* * * * *